Figure 1:
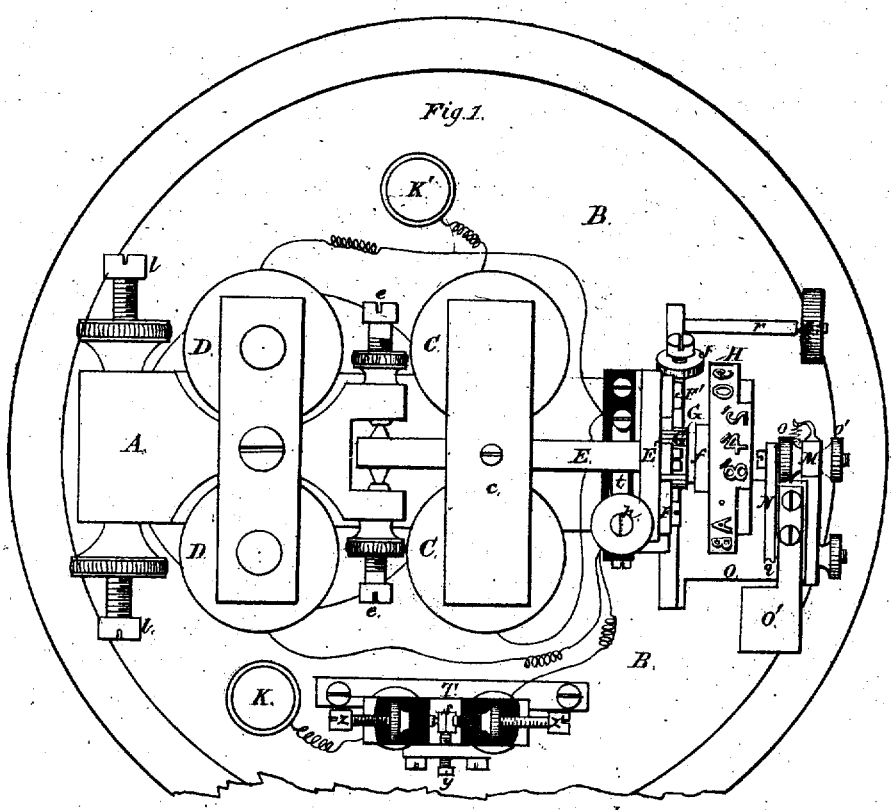

2 Sheets--Sheet 1.

F. L. POPE & T. A. EDISON.

Printing Telegraphs.

No. 5,523. Reissued August 5, 1873.

Witnesses.
M. M. Lumpton
T. B. Beeken

Inventors.
Frank L. Pope
Thomas A. Edison

2 Sheets--Sheet 2.
F. L. POPE & T. A. EDISON.
Printing Telegraphs.
No. 5,523.
Reissued August 5, 1873.
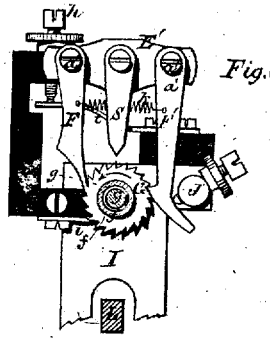
Fig. 3.
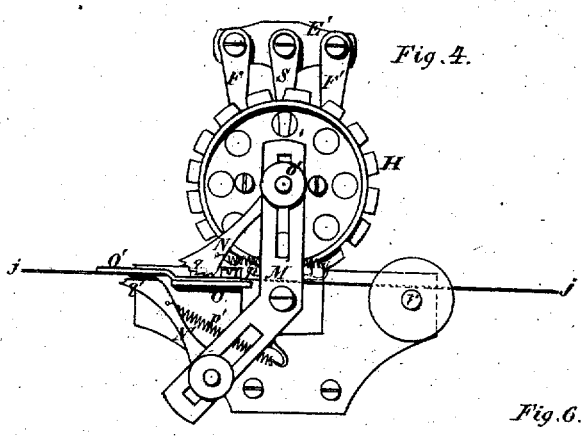
Fig. 4.
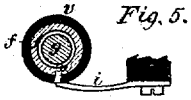
Fig. 5.
Fig. 6.
123 · 1/2 · 58
Fig. 7.
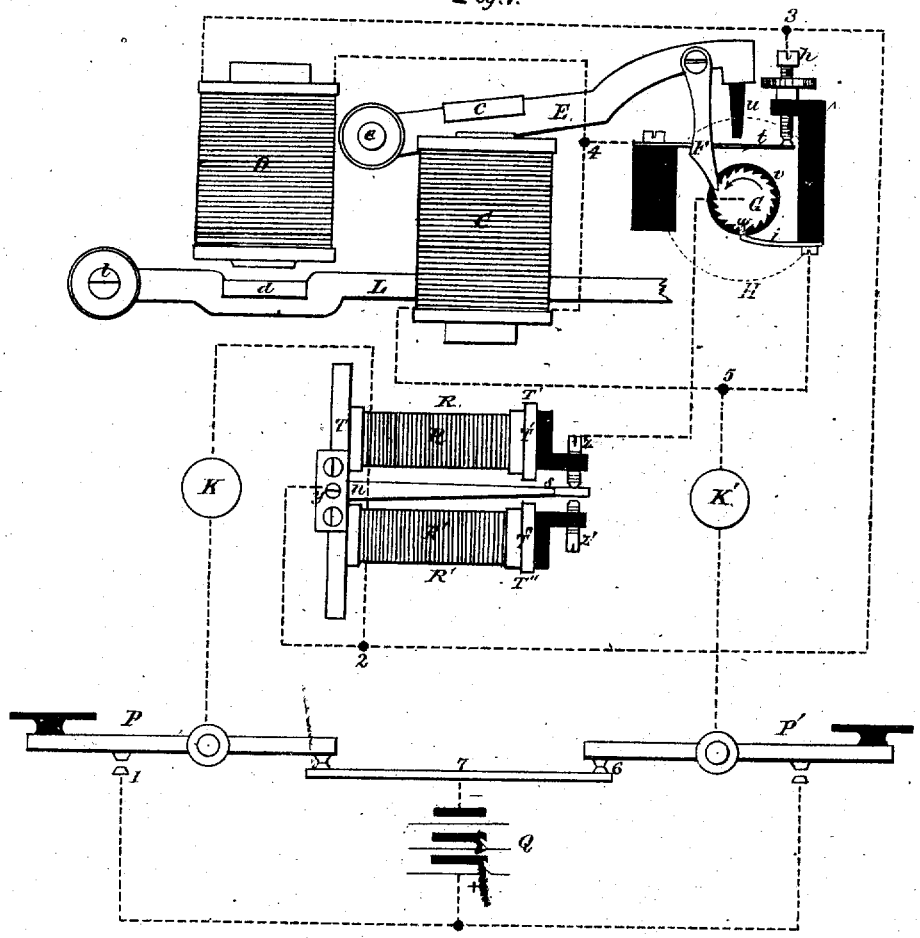
Witnesses; M. M. Lippitt, J. R. Berueter
Inventors; Frank L. Pope, Thomas A. Edison

UNITED STATES PATENT OFFICE.

FRANK L. POPE, OF ELIZABETH, AND THOMAS A. EDISON, OF NEWARK NEW JERSEY, ASSIGNORS, BY MESNE ASSIGNMENTS, TO THE GOLD AND STOCK TELEGRAPH COMPANY, OF NEW YORK CITY.

IMPROVEMENT IN PRINTING-TELEGRAPHS.

Specification forming part of Letters Patent No. 103,924, dated June 7, 1870; Reissue No. 5,523, dated August 5, 1873; application filed June 19, 1873.

*To all whom it may concern:*

Be it known that we, FRANK L. POPE, of Elizabeth, in the county of Union and State of New Jersey, and THOMAS A. EDISON, formerly of the city and State of New York, now of Newark, in the county of Essex and State of New Jersey, have invented Improvements in Printing-Telegraphs, of which the following is a specification:

The object of this invention is to furnish a telegraphic instrument by means of which communications may not only be recorded automatically, in printed characters, at one or more distant points, at the pleasure of the transmitting-operator, but by which this result may be accomplished with greater certainty, and in a much more simple manner, than by the apparatus hitherto used for this purpose.

The principal features of this improvement may be stated as follows: First, to the placing of the electro-magnet which rotates the type-wheel in the same electrical circuit with a second electro-magnet which operates the printing mechanism, and so arranging them that the printing mechanism will act in consequence of a pause when the type-wheel has been brought to its desired position. Second, to a shunt applied in the circuit that passes to the printing and type wheel electro-magnets, to intensify the action of the printing-magnet after the type-wheel has been set, whereby the rapidity of the instrument will be promoted without necessarily increasing the power of the battery. Third, to the use of an electrical cut-off, which we term the unison cut-off, and by means of which any number of printing-telegraph instruments may be brought into correspondence with the transmitting instrument at the pleasure of the transmitting-operator. Fourth, to the use of an electro-magnetic switch of peculiar construction, which is employed for the purpose of placing the unison cut-off in circuit, and which may also be made useful for other purposes in connection with printing-telegraph instruments. Fifth, to an improved paper-feeding mechanism for printing-telegraph instruments. Sixth, to the placing of certain duplicate figures or characters in a peculiar position upon the type-wheel, for purposes hereinafter specified.

The arrangement of the various parts of this invention will be more fully understood by reference to the accompanying drawing, in which—

Figure 2:
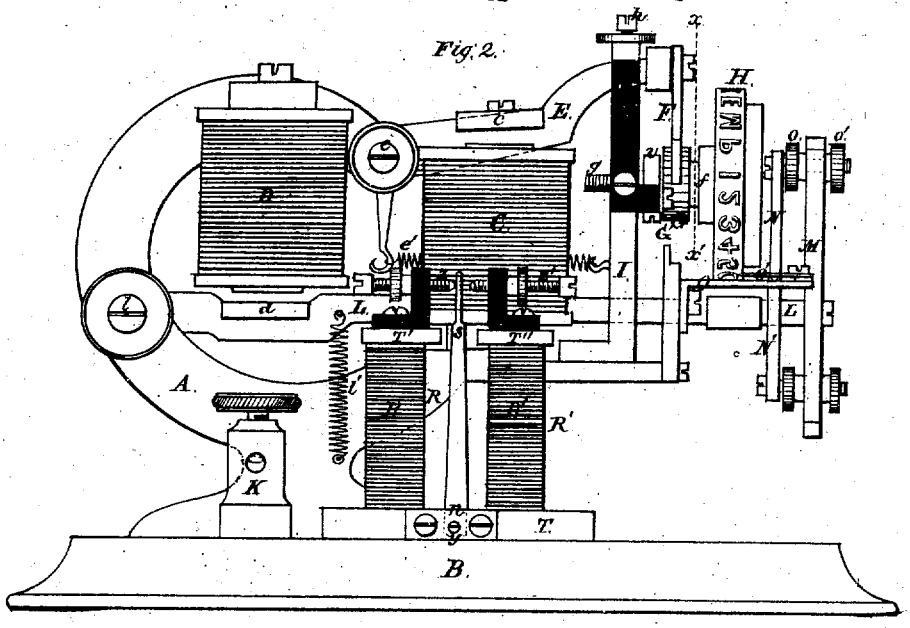

Figure 1 represents a plan view of the receiving and recording apparatus. Fig. 2 is a side elevation of the same. Fig. 3 is a sectional front view of a portion of the apparatus taken through the line *x x'*, Fig. 2. Fig. 4 is a detached front view, showing the device for moving the paper forward beneath the type-wheel. Fig. 5 is a sectional view, showing the details of the unison cut-off. Fig. 6 illustrates the manner in which numbers and fractions are printed by the apparatus. Fig. 7 is a theoretical diagram designed to show the electrical connections of the various parts of the apparatus and their relations to each other, whereby the desired results are obtained.

A (see Figs. 1 and 2) designates a metallic frame or standard, which is firmly secured to the pedestal or base *b*, and which serves as a support to the different portions of the receiving instrument. An electro-magnet, C, is secured, preferably in an upright position, upon the lower portion of the frame A, and a second similar electro-magnet, D, is placed, in a preferably inverted position, upon the upper portion of the said frame. The armature *c* of the electro-magnet C is attached to a lever, *e*, which moves upon pivots *e e* fixed in the upper extremity of the frame A. A pawl, F, Figs. 1, 2, 3, and 4, is pivoted at *a* to the cross-head E at or near the end of the lever E. This pawl engages with the teeth of a ratchet-wheel, G, as shown in Fig. 3. The ratchet-wheel G, and also the type-wheel H, are mounted upon a sleeve, *f*, which revolves upon a stationary spindle, *g*, projecting from the standard I, which latter is supported by the frame A. This arrangement will be clearly understood by reference to Figs. 1, 2, and 3. The cross-head E', Fig. 3, is also provided with a second pawl, F', which is pivoted at $a'$, and is provided at one end with a hook, which acts upon the opposite side of the wheel G. A stop, S, is permanently secured to the cross-head E′ midway between the pawls F and F′. The pawls F and F′ are kept in contact with the face of the wheel G by means of a spring, K, or in any other suitable manner.

By reference to Fig. 3 it will readily be understood that a downward movement of the lever E and the cross-head E′, caused by the attraction of the electro-magnet C, will cause the pawl F to engage with a tooth of the ratchet-wheel G, and cause the latter to rotate the distance of half the depth of the tooth in the direction of the arrow, when its movement is arrested by the stop S coming between the teeth of the wheel G. The pawl F′ has meantime passed one tooth of the wheel G, and when the lever E returns to its former position it engages with the said tooth and rotates the wheel the distance of half the depth of a tooth farther, when its motion is arrested by the stop J. Thus each movement of the lever E, in both directions, advances the wheel G one tooth in the direction of the arrow, and an intermittent rotary motion is imparted to said wheel G by the vibrations of the lever E under the influence of the electro-magnet C. This intermittent rotary motion is imparted to the sleeve $f$ and the type-wheel H. The ratchet-wheel G is provided with a number of teeth corresponding to the number of letters, figures, or characters upon the circumference of the type-wheel G, so that the latter may be brought to any desired position by transmitting the appropriate number of electrical pulsations through the electro-magnet C, each pulsation advancing the wheel G one tooth, and the type-wheel H one character, through the medium of the armature $c$, lever E, and pawl F, as hereinbefore explained.

The electrical connections between the different portions of the apparatus are only partially seen in Figs. 1 and 2, but are fully shown in Fig. 7, which will be hereafter explained.

The apparatus for taking the impression of any desired letter, when the type-wheel has been brought to the proper position, is constructed and operates as follows: Underneath the electro-magnet D, Fig. 2, is a horizontal lever, L, to which its armature $d$ is attached. This lever is capable of a slight vertical motion upon the pivots $l\ l$. The lever L passes between the helices of the electro-magnet C, and through an aperture in the standard I. The strip of paper $j\ j$, Fig. 4, passes over the extremity of the lever L and underneath the type-wheel H. When the electro-magnet D becomes sufficiently excited by the passage of the electrical current its attraction will be exerted upon the armature $d$, thereby raising the lever L and bringing the strip of paper $j\ j$ forcibly in contact with the character upon the type-wheel H, which is over it at the time. The characters upon the type-wheel having been previously inked by means of an inking-roller or other suitable device, an impression of the said character is made upon the paper. Upon the cessation of the electric current in the coils of the electro-magnet D the lever L is drawn back to its original position by means of the spring $l'$.

The device for moving the paper forward after each impression has been made is constructed and operates as follows: Upon the end of the lever L there is secured a slotted bar, M, Figs. 1, 2, and 4, which moves vertically with said lever L. To the upper portion of this bar there is attached a feeder, N, by means of adjustable set-screws $o$ and $o'$, which allow of its being secured at any desired point upon the bar M. The feeder N is placed in an inclined position, as shown in Fig. 4, its lower extremity being serrated or provided with spurs $q'$ and resting upon the strip of paper $j\ j$, which at that point is supported by the bed-plate O. The feeder N is kept in contact with the paper by means of a spiral spring, $q$. A second feeder, N′, is attached in the same manner to the lower part of the bar M, so as to rest against the under side of the strip of paper at $q'$, which paper passes underneath the plate O′, as shown in Figs. 1, 2, and 4. By an inspection of Fig. 4 it will be understood that when the lever L and its bar M descend, after an impression has been made, the lower end of the feeder N is thrust to the left, and the paper is pushed forward by its spurs $q$. When the lever L is again moved upward the feeder N′ in the same manner advances the paper still farther to the left. By this arrangement the feeders N and N′ may be so adjusted that a comparatively slight vertical movement of the lever L will cause a considerable horizontal movement of the strip of paper $j\ j$, and the amount of this movement may be regulated at pleasure by altering the position of the set screws $o$ and $o$ upon the bar M.

The manner in which the several parts of the apparatus are electrically connected and operated will be understood by reference to Fig. 7, which is a theoretical diagram showing the various parts heretofore described, in relation to each other and with their proper electrical connections.

In Fig. 7, Q represents a voltaic battery of any suitable construction, the positive and negative poles of said battery being distinguished in the drawing by the signs + and −. P is a key or circuit-breaker, which may be of any suitable construction. The battery Q and key P, it is to be understood, are situated at the transmitting-station. By means of the circuit-breaker P a series of successive pulsations may be transmitted through the conducting-wires and the electro-magnets of the receiving apparatus. Starting from the positive pole of the battery Q, the circuit may be traced to the anvil 1 of the key P, thence through the electro-magnet R R, (for purposes hereinafter explained,) to the point 2, and thence to the point 3. From the point 3 to the point 4 two routes are open to the current, one through the helices of the electro-magnet D and the other through the screw *h* and flat spring *t*. The latter route being much the shortest and offering little or no resistance to the passage of the current, the electro-magnet D will not be perceptibly affected by the passage of the current as long as the branch circuit through *h* and *t* remains uninterrupted. From the point 4 the current passes through the helices of the electro-magnet C to the point 5, and thence by 6 and 7 to the other pole of the battery Q. When the lever E is drawn down by the action of the electro-magnet C an insulated pin, *u*, Fig. 7, strikes the spring *t* just before the movement of the former is arrested, and breaks the electrical contact between it and the screw *h*. The entire current is therefore momentarily thrown through the helices of the electro-magnet D at each vibration of the lever E; but when these vibrations are performed with considerable rapidity the electro-magnet D is not kept in circuit long enough to become completely magnetized. When the circuit remains closed for a longer time the electro-magnet D becomes fully magnetized and attracts its armature *d*, thereby raising the lever L and bringing the strip of paper *j j* against the type upon the type-wheel H.

It will therefore be understood from the above explanation that the impression of any given character upon the type-wheel H may be produced upon the paper *j j* by an operator stationed at a distant point—as, for example, at P (see Fig. 7)—simply by transmitting the proper number of electrical impulses of short duration by means of a properly-constructed circuit-breaker, which will cause the type-wheel H to revolve without sensibly affecting the impression device.

When the desired character is brought opposite the impression-lever L the duration of the final current is prolonged, and the electro-magnet D becomes fully magnetized, and therefore an impression of the letter or character upon the paper is produced in the same manner hereinbefore described.

When a number of automatic printing-telegraph instruments are situated at different points and operated simultaneously in one circuit, it is desirable that some suitable means may be provided whereby the transmitting-operator may be enabled to bring the type-wheels of the several receiving or recording instruments into correspondence at pleasure. This is effected by the following device: Upon the sleeve *f*, which carries the type-wheel H and ratchet-wheel G, is secured a collar, *v*, Figs. 2, 5, and 7. This collar is composed of some suitable insulating material. We will here observe that in all the figures the non-conducting material employed to insulate one portion of the apparatus from another is represented in black. A metallic spring, *i*, fixed upon an insulating-support, Figs. 5 and 7, presses against this collar as it revolves. A metallic pin or stud, *w*, is inserted into the sleeve *f*, passing through the insulating-collar, as shown in Figs. 5 and 7, in such a manner as to form an electrical connection between the sleeve *f* and the spring *i* whenever the pin or stud *w* is brought in contact with said spring by the revolution of the sleeve *f*. This arrangement is clearly shown in Figs. 5 and 7.

By reference to Fig. 7, in which the electrical connections are shown in dotted lines, it will be understood that this connection forms a short circuit between the point 2 and the point 5, cutting off nearly all the electric current from the electro-magnets C and D, and thereby arresting their action. This short circuit may be brought into action at the pleasure of the transmitting-operator by means of the device next described. R R′, Figs. 3 and 7, designate the helices of a small electro-magnet, whose poles are shown at $T^1$ and $T^2$, the opposite ends of the cores being screwed into the soft-iron bar T. A permanently-magnetized steel bar, *n s*, is pivoted to the bar T at *y*, its opposite extremities being free to vibrate between the screws Z and Z′.

In consequence of a well-known law of magnetic action, when a current from the battery Q passes through the helices of the electro-magnet R R′ in one direction the south end *s* of the magnet-bar *n s* will be attracted by $T^1$ and repelled by $T^2$, while a current in the opposite direction will produce the reverse effect. One pole of the polarized bar *n s* being in magnetic contact with the mass of soft iron formed by the bar T and its attachments, its magnetism cannot be weakened or reversed, as is often the case with magnetized armatures which are not in magnetic contact with the soft iron of the electro-magnet.

From this explanation, and by reference to Fig. 7, it will be readily understood that the transmitting operator, by employing the circuit-breaker P′ instead of P, can send a series of electrical pulsations through the circuit in the opposite direction, which will cause the south end *s* of the bar *n s* to be deflected toward $T^1$, so as to come in contact with the stop *z*.

As it is a matter of indifference in which direction the current passes through the electro-magnet C in order to operate it, the type-wheel of each instrument will continue to revolve by its action, as usual, until the pin or stud *w* comes in contact with the spring *i*, when a short circuit will be formed from 2, Fig. 7, through *n*, *s*, and *z*, to the metallic frame of the instrument, and thence through sleeve *f*, pin or stud *w*, and spring *i*, to the point 5, and thence by the usual route. The principal part of the current will take the shorter route, just described, and the action of the electro-magnet C, and consequently, the movement of the type-wheel H, will be arrested. Each instrument in the circuit will therefore stop automatically at the same point in the revolution of the type-wheel H and sleeve *f*. When this has been accomplished the electric current is again reversed, and the operation of the apparatus proceeds as usual.

When the instrument hereinbefore described is intended to be used for recording quotations of markets, &c., wherein the amounts to be represented fluctuate by eighths of one per cent., three duplicate figures or characters are placed upon the periphery of the type-wheel H in such a position as to impress themselves upon the strip of paper lower than the line of the other figures or characters upon the wheel, which may be used in combination with the ordinary numerals to indicate fractional quantities. The arrangement of these characters upon the type-wheel is shown in Fig. 1, and the manner in which their impressions upon the paper are combined with those of the numerals to represent fractional quantities is shown in Fig. 6. By means of this device the total number of characters upon the type-wheel may be considerably reduced, and the speed of transmission correspondingly augmented.

It is obvious that letters as well as characters may be placed upon the type-wheel in a different circumferential plane in the same manner as the figures just referred to, and in such cases the letters, figures, or characters in the one circumferential plane would be opposite blank spaces in the other circumferential plane, and hence no two letters, figures, or characters would be in the same axial plane. This arrangement of letters, figures, or characters upon the type-wheel of a printing-telegraph we believe to be new.

No claim is made to an electro-magnet for operating the type-wheel of a printing-telegraph instrument in the same circuit with the electro-magnet that actuates the printing mechanism; nor to the use of a device for bringing the transmitting and receiving apparatus into unison from the transmitting-station, as this is shown in the patent granted to Charles Kirchof, April 15, 1856, and also in the patent granted to S. S. Laws, January 25, 1870.

What is claimed as the invention of said F. L. Pope and T. A. Edison is—

1. In a printing-telegraph instrument, the arrangement of two electro-magnets in the same electrical circuit, one being employed to rotate the type-wheel and the other to actuate the printing mechanism, when the action of the latter is controlled by that of the former by means of a branch or short circuit and a mechanical cut-off, or its equivalent, constructed and operated substantially as described.

2. An improved cut-off, termed an electrical-unison cut-off, whereby, at a given point in the revolution of a ratchet or type wheel, a shunt or branch circuit may be brought into action, and the electrical current diverted from the electro-magnet controlling the movement of the said ratchet or type wheel, so that the said movement may be arrested at such given point, the same being constructed and operated substantially as specified.

3. The electro-magnet R R′ and soft-iron bar T, in combination with a polarized-steel bar, *n s*, so arranged that said steel bar will be in magnetic contact with the said soft-iron bar, substantially as herein specified.

4. The bar M, feeder N or N′, spurs *q* or *q′*, bed-plates O or O′, combined, arranged, and operating substantially as described, and for the purposes specified.

5. The combination of the lever E, pawls F and F′, stops S and J, and ratchet-wheel G, arranged and operating substantially as described.

6. The combination of the pawl F, stop S, and ratchet-wheel G, substantially as and for the purposes specified.

7. The electro-magnet R R′, soft-iron bar T, and polarized-steel bar *n s*, in combination with the spring *i*, insulated collar *v*, and pin or stud *w*, in the manner described, and for the purposes specified.

8. The combination, with an electro-magnet in a telegraphic-printing apparatus, of a type-wheel whose periphery is provided with integral numbers, so arranged upon said type-wheel that fractions of numbers may be printed upon the paper, thereby decreasing the number of characters upon the type-wheel and insuring great rapidity in recording, substantially as herein shown and described.

9. In a printing-telegraph, a type-wheel provided with letters, figures, or characters, which are arranged in two different lines around the periphery of said wheel, and in such manner that the said letters, figures, or characters in the one line shall be opposite blank spaces in the other line, substantially as herein specified.

10. A printing-telegraph instrument with the metallic circuit of the main line passing through both the type-wheel and the printing electro-magnets, in combination with a shunt circuit or switch that operates to energize the printing-magnet during a pause after the type wheel has been set.

Signed this 16th day of June, A. D. 1873.

MARSHALL LEFFERTS,
*President the Gold and Stock Telegraph Co.*
NORMAN C. MILLER,
*Secretary.*

Witnesses:
Geo. T. Pinckney,
Chas. H. Smith.